United States Patent [19]

Matsuda

[11] Patent Number: 4,989,685
[45] Date of Patent: Feb. 5, 1991

[54] AUTOMOTIVE TRACTION CONTROL SYSTEM WITH FEATURE OF SELECTING WHEEL SLIPPAGE INDICATIVE PARAMETER DEPENDING UPON VEHICLE SPEED

[75] Inventor: Toshiro Matsuda, Sagamihara, Japan

[73] Assignee: Nissan Motor Company, Limited, Yokohama, Japan

[21] Appl. No.: 372,157

[22] Filed: Jun. 27, 1989

Related U.S. Application Data

[63] Continuation of Ser. No. 918,137, Oct. 14, 1986, abandoned.

[30] Foreign Application Priority Data

Oct. 11, 1985 [JP] Japan .................. 60-224934

[51] Int. Cl.⁵ .............................................. B60K 28/10
[52] U.S. Cl. ................................. 180/197; 180/233
[58] Field of Search ................... 180/197, 233, 142

[56] References Cited

U.S. PATENT DOCUMENTS

| | | | |
|---|---|---|---|
| 3,776,357 | 12/1973 | Aria et al. ................... | 180/197 |
| 3,893,535 | 7/1975 | Burckhardt et al. ............ | 180/82 R |
| 4,075,538 | 2/1978 | Plunkett ..................... | 318/52 |
| 4,538,700 | 9/1985 | Suzuki ....................... | 180/248 |
| 4,562,541 | 12/1985 | Sakakiyama ................... | 364/424.1 |
| 4,625,824 | 12/1986 | Leiber ....................... | 180/197 |
| 4,637,487 | 1/1987 | Nakamura et al. .............. | 180/197 |

FOREIGN PATENT DOCUMENTS 123280 10/1984 European Pat. Off. .
59-68537 4/1984 Japan .

*Primary Examiner*—Richard A. Bertsch
*Assistant Examiner*—Mitchell Bompey
*Attorney, Agent, or Firm*—Foley & Lardner, Schwartz, Jeffery, Schwaab, Mack, Blumenthal & Evans

[57] ABSTRACT

A traction control system has a plurality of wheel speed sensor means for producing wheel speed indicative signals respectively representative of wheel speeds of associated vehicular wheels. Wheel slippage is detected by comparing wheel speed measured by the wheel speed sensor means and an approximated vehicle speed indicative value. The approximated vehicle speed indicative value is derived based on one of wheel speed selected depending upon a vehicle speed.

17 Claims, 9 Drawing Sheets

AUTOMOTIVE TRACTION CONTROL SYSTEM WITH FEATURE OF SELECTING WHEEL SLIPPAGE INDICATIVE PARAMETER DEPENDING UPON VEHICLE SPEED

This application is a continuation of application Ser. No. 06/918,137, filed Oct. 14, 1986, now abandoned.

BACKGROUND OF THE INVENTION

1. Field of the Invention

The present invention relates generally to a traction control system for an automotive vehicle, for detecting wheel slippage, such as spinning, skidding and so forth, to adjust driving torque to apply on vehicular wheels. More specifically, the invention relates to an automotive traction control system which can precisely detect vehicle speed. Further particularly, the invention relates to a traction control system which is applicable for controlling traction of four-wheel drive vehicle.

2. Description of the Background Art

In general, wheel slippage is reflected in a difference of an actual vehicle speed and an assumed vehicle speed at the vehicle derived based on a wheel speed. When the actual vehicle speed is lower than the assumed vehicle speed, it means that the driven wheel is spinning. When the actual vehicle speed is higher than the assumed vehicle speed, it means that the vehicle wheel causes skidding. Wheel-spinning is caused by loss of road/tire traction. Therefore, in such case, traction control has to be performed in order to prevent the vehicular wheel from spinning. Wheel-skidding occurs during application of abrupt brake and is caused by locking of the wheel. For example, such traction controls have been disclosed in U.S. Pat. No. 3,893,535, issued on Jul. 8, 1975, to M. H. Burckhardt, et al. and in Japanese Patent First Publication No. (Tokkai Showa) 59-68537, published on Apr. 18, 1984. In both cases, a rotation speed of a driven wheel which is driven by an engine output is compared with a rotation speed of a non-driven wheel which rotates freely. The rotation speed of the non-driven wheel is treated as a parameter reflecting an actual vehicle speed.

The detection of the wheel slippage as disclosed in the aforementioned prior art is not applicable for antiskid or traction control for a four-wheel drive vehicle.

Furthermore, when traction control is performed in a substantially precise manner upon starting the vehicle running on a slippery muddy road, driving torque tends to be reduced to a at which no wheel-spin occurs for any wheels. This results in a lack of driving torque which makes the vehicle impossible to run. In order to allow the vehicle to start-up on a slippery or muddy road, precision of the traction control has to be lowered. Lowering of precision will allow wheel-spin on the wheels. This degrades drivability when the vehicle is running at relatively high speed.

SUMMARY OF THE INVENTION

Therefore, it is an object of the present invention to provide a traction control system which is applicable even for four-wheel drive vehicle.

Another object of the invention is to provide a traction control system which can derive an vehicle speed indicative value even in a situation where it is applied for traction control of a four-wheel drive vehicle.

A further object of the present invention is to provide a traction control system which has variable precision of the detection of wheel slippage for adapting the traction control to vehicle driving conditions.

A still further object of the present invention is to provide a traction control system which can provide sufficient driving torque for wheels upon starting-up of the vehicle by lowering the precision level of the wheel slippage detection at a low vehicle speed range and can provide sufficient driving stability by increasing the precision level in a high vehicle speed range.

In order to accomplish the aforementioned and other objects, a traction control system, according to the present invention, has a plurality of wheel speed sensor means for producing wheel speed indicative signals respectively representative of wheel speeds of associated vehicular wheels. Wheel slippage is detected by comparing wheel speed measured by the wheel speed sensor means and a vehicle speed indicative value. The vehicle speed indicative value is derived based on one of the wheel speeds selected depending upon a vehicle speed.

According to one aspect of the invention, a traction control system for an automotive vehicle comprises first sensor means for monitoring wheel speed of a first vehicular wheel for producing a first wheel speed indicative signal, second sensor means for monitoring wheel speed of a second vehicular wheel for producing a second wheel speed indicative signal, means for deriving a vehicle speed representative value based on one of the first and second wheel speed indicative signal, means for selecting one of the first and second wheel speed indicative signals depending on the vehicle speed representative value, and means for comparing selected one of the first and second wheel speed indicative signals with the vehicle speed representative value for producing a control signal to reduce driving torque to be distiributed to the first and second vehicular wheels when the selected one of first and second wheel speed indicative signals becomes greater than the vehicle speed representative value.

The traction control system further comprises means for deriving wheel acceleration based on the selected one of the first and second wheel speed indicative signals and comparing the wheel acceleration with a given first acceleration threshold to produce a first command for latching one of the first and second wheel speed indicative signal value, and the vehicle speed representative value deriving means is responsive to the first command for latching one of the first and second wheel speed indicative value to derive the vehicle speed representative value based on the latched value.

In the preferred embodiment, the vehicle speed representative value deriving means selects one of the first and second wheel speed indicative signal which has the smaller value than the other. The vehicle speed representative value deriving means measures an elapsed time from latching one of the first and second wheel speed indicative signal signal values to derive a value which is a function of the elapsed as is to be added to the latched value for deriving the vehicle speed indicative value.

Alternatively, the selecting means compares the vehicle speed representative value with a vehicle speed threshold to select one of the first and second wheel speed indicative signals which has a value greater than the other when the vehicle speed representative value is greater than the vehicle speed threshold and to select one of the first and second wheel speed indicative signals having a value smaller than the other when the vehicle speed representative value is smaller than the vehicle speed threshold.

The traction control system further comprises a throttle valve operating mechanism for causing angular displacement of a throttle valve, the throttle valve operating mechanism is controlled by the control signal for reducing a throttle valve open angle when the selected one of first and second wheel speed indicative signal becomes greater than the vehicle speed representative value. The throttle valve operating mechanism includes an electrically operated throttle servo system for driving the throttle valve to cause angular displacement thereof, the throttle servo system is normally responsive to a desired engine speed demand from an accelerator position sensor and responsive to the control signal for driving the throttle valve to reduce the open angle thereof.

According to another aspect of the invention, a traction control system for an automotive vehicle comprises first sensor means for monitoring wheel speed of a faster vehicular wheel for producing a first wheel speed indicative signal, second sensor means for monitoring wheel speed of a slower vehicular wheel for producing a second wheel speed indicative signal, means for deriving an vehicle speed representative value based on the second wheel speed indicative signal, means for selecting one of the first and second wheel speed indicative signals depending on the vehicle speed representative value, the selecting means selecting the first wheel speed indicative signal when the vehicle speed representative value is greater than a high vehicle speed criterion, and selecting the second wheel speed indicative signal otherwise, and means for comparing selected one of the first and second wheel speed indicative signals with the vehicle speed representative value for producing a control signal to reduce driving torque to be distributed to the first and second vehicular wheels when the selected one of first and second wheel speed indicative signals becomes greater than the vehicle speed representative value.

According to a further aspect of the invention, a method for controlling road/tire traction for an automotive vehicle comprises the steps of:
monitoring wheel speed of a first vehicular wheel for producing a first wheel speed indicative signal;
monitoring wheel speed of a second vehicular wheel for producing a second wheel speed indicative signal;
deriving a vehicle speed representative value based on one of the first and second wheel speed indicative signal;
selecting one of the first and second wheel speed indicative signals depending on the vehicle speed representative value;
comparing selected one of the first and second wheel speed indicative signals with the vehicle speed representative value for producing a control signal to reduce driving torque to be distributed to the first and second vehicular wheels when the selected one of first and second wheel speed indicative signals becomes greater than the vehicle speed representative value.

DESCRIPTION OF THE PREFERRED EMBODIMENT

Figure 1:
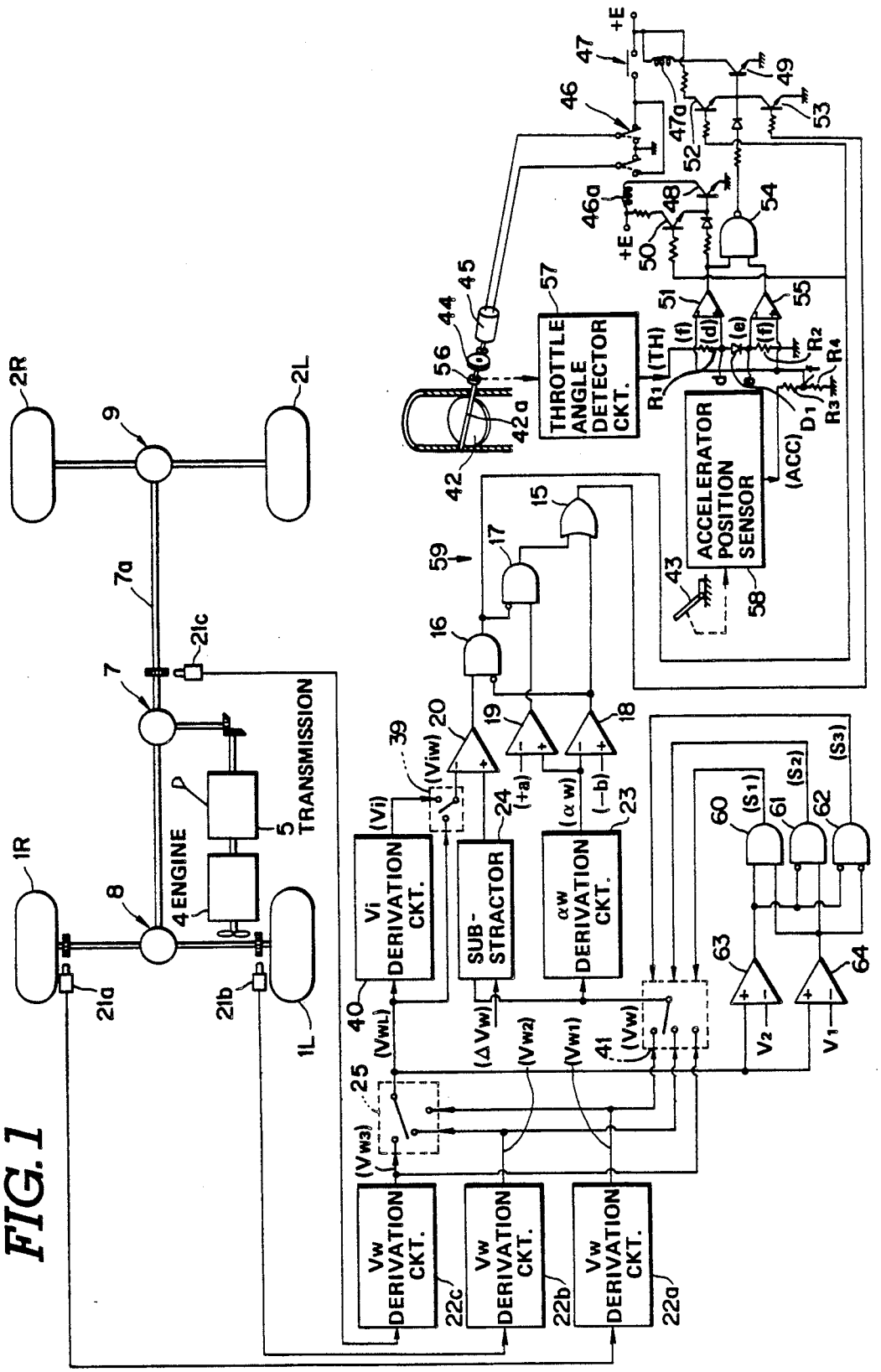
FIG. 1 is a diagram showing the preferred embodiment of a traction control system, in which the preferred embodiment of a wheel slippage derivation system according to the invention, is incorporated.

Referring now to the drawings, particularly to FIG. 1, the preferred embodiment of a traction control system, according to the invention, controls road/tire traction at respective left-front wheel $1_L$, right-front wheel $1_R$, left-rear wheel $2_L$ and right-rear wheel $2_R$, by controlling a revolution speed of an automotive engine 4. In the shown embodiment, the preferred embodiment of the traction control system is applied to a four wheel drive vehicle. Therefore, all of the left-front wheel $1_L$, right-front wheel $1_R$, left-rear wheel $2_L$ and right-rear wheel $2_R$ are driven wheels. An output of the engine 5 is distributed through a power transmission 4, a center differential gear assembly 7, a front differential gear assembly 8 or a rear differential gear assembly 9.

The preferred embodiment of a traction control system generally adjusts an engine output torque for controlling road/tire traction and reducing wheel slippage. In order to adjust the engine output torque, an angular position of a throttle valve 42 is controlled by means of a throttle servo system which will be described later. The throttle servo system is controlled by a controller which generally detects wheel slippage to output a control signal.

Figure 2:
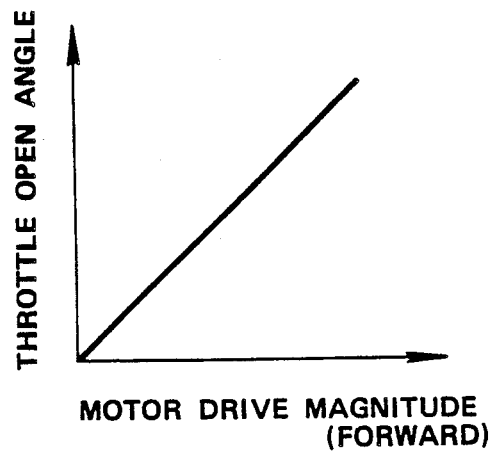
FIG. 2 is a graph showing a relationship between a driving magnitude of a throttle servo motor and an open angle of a throttle valve, which throttle servo motor is employed in another embodiment of the traction control system of FIG. 11.

As shown in FIG. 1, the throttle servo system generally comprises an electric motor 45 connected to a throttle valve shaft 42a through a reduction gear assembly 44. The driving magnitude of the motor 45 is controlled by a control signal having a value generally indicative of a magnitude of depression of an accelerator pedal 43. FIG. 2 shows the relationship between the throttle valve angular position (open angle) and the driving magnitude of the motor 45. As will be appreciated herefrom, the throttle valve open angle varies in a linear fashion with respect to the driving magnitude of the motor 45.

The terminals of the motor 45 are connected to relay switch 46. The relay switch 46 is connected to an electric power source +E through a relay 47. The relay 47 is associated with a solenoid 47a to be operated between open position and closed position. The relay switch 46 is cooperative with the relay 47 so that the motor 45 is not driven while the solenoid 47a is deenergized to hold the relay 47 at an open position. When the solenoid 47a is energized and the relay switch 46 is in a position illustrated by the solid line in FIG. 1, the motor 45 is driven in a forward direction to increase the throttle valve open angle. On the other hand, when the relay 47 is closed while the relay switch 46 is shifted to the position illustrated by the phantom line in FIG. 1, the motor is driven in a reverse direction to reduce the throttle valve open angle.

Figure 11:
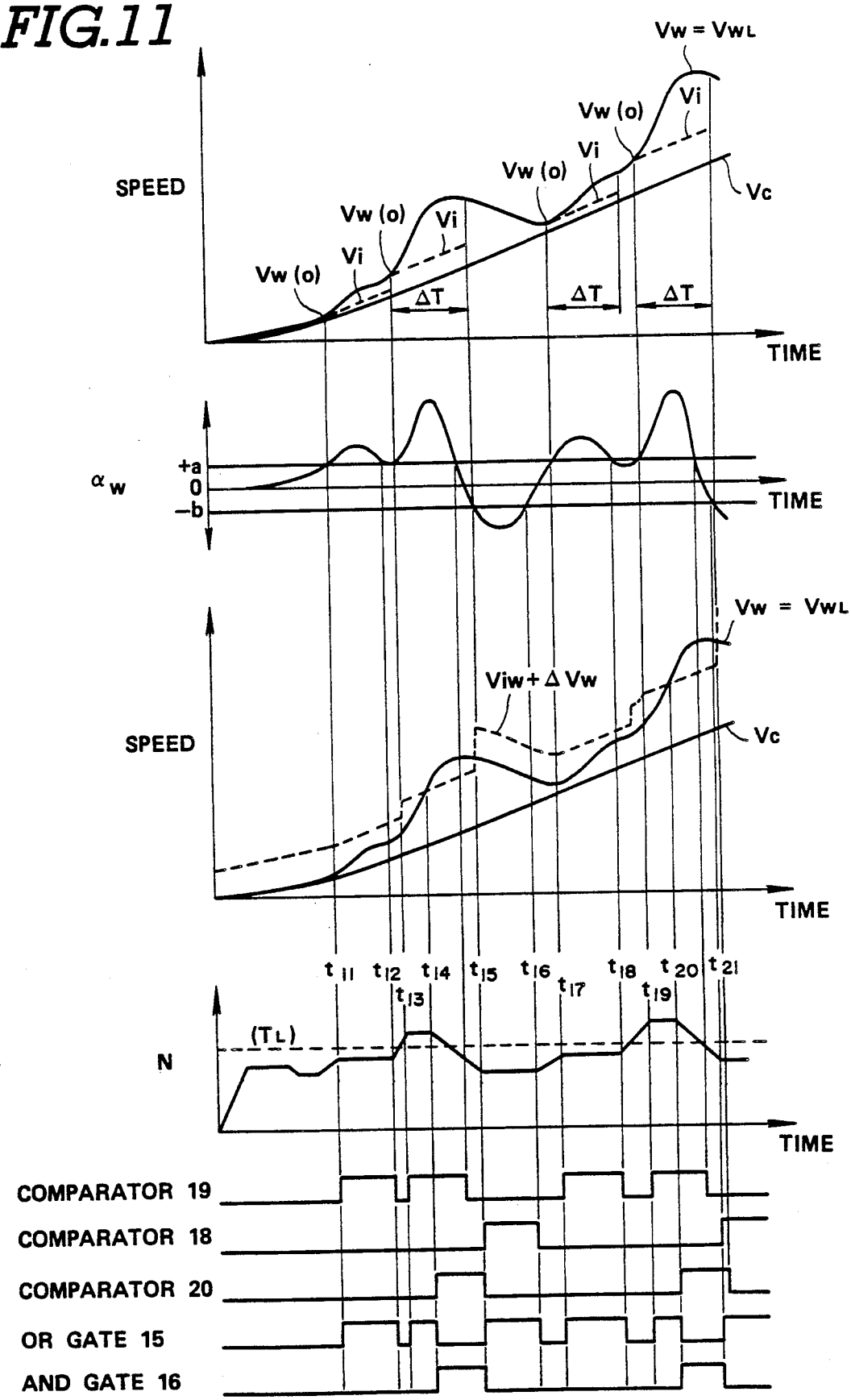
FIG. 11 is a timing chart showing operation of the preferred embodiment of the traction control system of FIG. 1.

The relay switch 46a is associated with a solenoid 46 for shifting between the positions illustrated by the solid line and the phantom line in FIG. 11. The relay switch position illustrated by the solid line will be hereafter referred to as the "forward position". Similarly, the relay switch position illustrated by the phantom line will be hereafter referred to as the "reverse position". The solenoids 46a and 47a are connected to the power source +E at one terminals. The other terminals of the solenoids 46a and 47a are connected to collector electrodes of transistors 48 and 49 so that they are connected to the ground through collector-emitter paths established in the transistors 48 and 49.

The base electrode of the transistor 48 is connected to the power source +E through collector-emitter path of a transistor 50. The base electrode of the transistor 48 is also connected to an ouput terminal of a comparator 51. On the other hand, the base electrode of the transistor 49 is connected to the power source +E through the collector-emitter path of a transistor 52 and to the ground through the collector-emitter path of a transistor 53. The base electrode of the transistor 49 is further connected to an output terminal of a NAND gate 54. One input terminal of the NAND gate 54 is connected to the comparator 51. The other input terminal of the NAND gate 54 is connected to a comparator 55.

The comparator 51 has a non-inverting input terminal connected to a throttle position detecting circuit 57. The throttle position detecting circuit 57 is connected to a rotary encoder 56 which is fixed to the throttle valve shaft 42a. The rotary encoder 56 produces pulse signal at every given angle of throttle valve angular displacement. The throttle position detecting circuit 57 counts up and down the pulse signal from the rotary encoder depending upon the direction of the throttle valve angular displacement, i.e. in closing direction and opening direction, to produce a throttle valve angular position indicative signal having a voltage TH indicative of the detected throttle valve angular position. The thottle valve angular position indicative signal of the throttle position detecting circuit 57 is voltage-divided by means of resistors $R_1$ and $R_2$. A diode $D_1$ is provided between the voltage dividing resistors $R_1$ and $R_2$ to provide voltage difference at junctions d and e at the amplitude corresponding to voltage drop caused by the diode. The voltage difference at the junctions d and e provides a hysterisis region as illustrated by the hatched area in FIG. 12. As will be seen in FIG. 11, the potential at the junction d is applied to the aforemention non-inverting terminal of the comparator 51.

The inverting input terminal of the comparator 51 is connected to an accelerator position sensor 58. The accelerator position sensor 58 is designed to produce an acclerator position indicative signal having a voltage ACC which is variable depending upon the acclerator position. The accelator position indicative signal is voltage-divided by means of a voltage divider constituted by resistors $R_3$ and $R_4$. The potential at a junction f between the voltage dividing resistors $R_3$ and $R_4$ is applied to the inverting terminal of the comparator 51. Therefore, the comparator signal of the comparator 51 becomes HIGH level when the throttle valve angular position indicative signal input to the non-inverting terminal as the potential at the junction d is greater than the accelerator position indicative signal as the potential at the junction f.

On the other hand, the comparator 55 is connected to the junction e at its inverting terminal to receive the throttle valve angular position indicative signal as the potential at the junction e. The non-inverting terminal of the comparator 55 is connected to the junction f to receive the accelerator position indicative signal as the potential at the junction f. Therefore, the comparator signal of the comparator 55 becomes HIGH when the potential at the junction e is smaller than the potential at the junction f.

The base electrodes of the transistors 50, 52 and 53 are respectively connected to a control circuit 59.

A base electrode of the transistor 53 is connected to an OR gate 15. The base electrodes of the transistors 50 and 52 are connected to an AND gate 16. The gate 15 has one input terminal connected to an AND gate 17. The other input terminal of the OR gate 15 is connected to an output terminal of a comparator 18. The AND gate 16a has one input terminal connected to a comparator 20 and the other input terminal which is inverting input terminal, connected to the output terminal of the comparator 18. The AND gate 17 is connected to the output terminal of the AND gate 16 via one inverting input terminal and to the output terminal of a comparator 19. With this arrangement, the AND gate 17 outputs a logical HIGH level gate signal when the gate signal of the AND gate 16 is a logical LOW level and a comparator signal from the comparator 19 is a logical HIGH level. The AND gate 16 outputs a logical HIGH level gate signal when a comparator signal from the comparator 18a is a logical LOW level and a comparator signal from the comparator 20 is a logical HIGH level.

The comparator 18 is connected to a wheel acceleration $a_w$ derivation circuit 23 at its inverting input terminal. The non-inverting terminal of the comparator 18 is connected to a reference signal generator which generates a reference signal having a value $-b$. The wheel acceleration $a_w$ derivation circuit 23 is also connected to a non-inverting input terminal of the comparator 19. An inverting input terminal is connected to a projected wheel speed derivation circuit 40. Non-inverting input terminal of the comparator 20 is connected to a subtraction circuit 24. Inverting input terminal of the comparator 20 is also connected to the select-LOW switch 39.

The wheel acceleration derivation circuit 25 and the subtraction circuit 24 are selectively connected to a wheel speed derivation circuit 22a, 22b and 22c via a selector switch 41. The selector switch 41 is active for selecting one of the wheel speed indicative signals from the wheel speed derivation circuits 22a, 22b and 22c depending upon the vehicle speed condition.

The wheel speed derivation circuits 22a, 22b and 22c are connected to respectively corresponding wheel speed sensors 21a, 21b and 21c. The wheel speed derivation circuit 22a is connected to the wheel speed sensor 21a monitoring rotation speed of a front-right wheel 1R for producing a front-right wheel speed indicative signal having a value $V_{w1}$ representative thereof. The wheel speed derivation circuit 22b is connected to the wheel speed sensor 21b for monitoring rotation speed of the front-left wheel 1L for producing a front-left wheel speed indicative signal having a value $V_{w2}$ representative thereof. The wheel speed derivation circuit 22c is connected to the wheel speed sensor 21c which monitors rotation speed of a propeller shaft 7a connecting the center differential gear assembly 7 and the rear differential gear assembly 9. The rotation speed of the propeller shaft 7a is taken as an average rotation speed of the rear wheels 2R and 2L. Therefore, the wheel speed derivation circuit 22c derives an average rotation speed $V_{w3}$ of the rear wheels to produce a rear wheel speed indicative signal.

Figure 3:
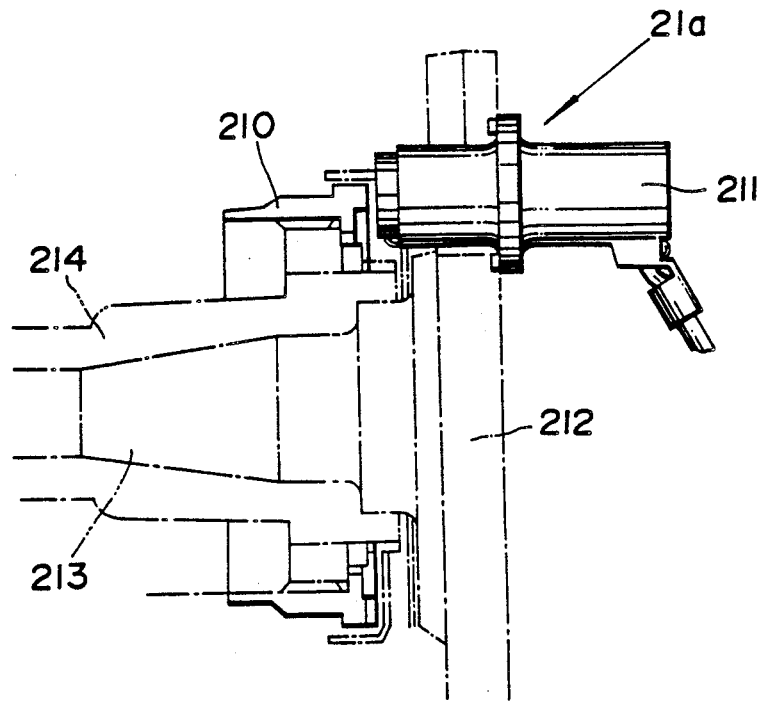
FIG. 3 is a front elevation of a wheel speed sensor to be employed in the preferred embodiment of the traction control system of FIG. 1.
Figure 4:
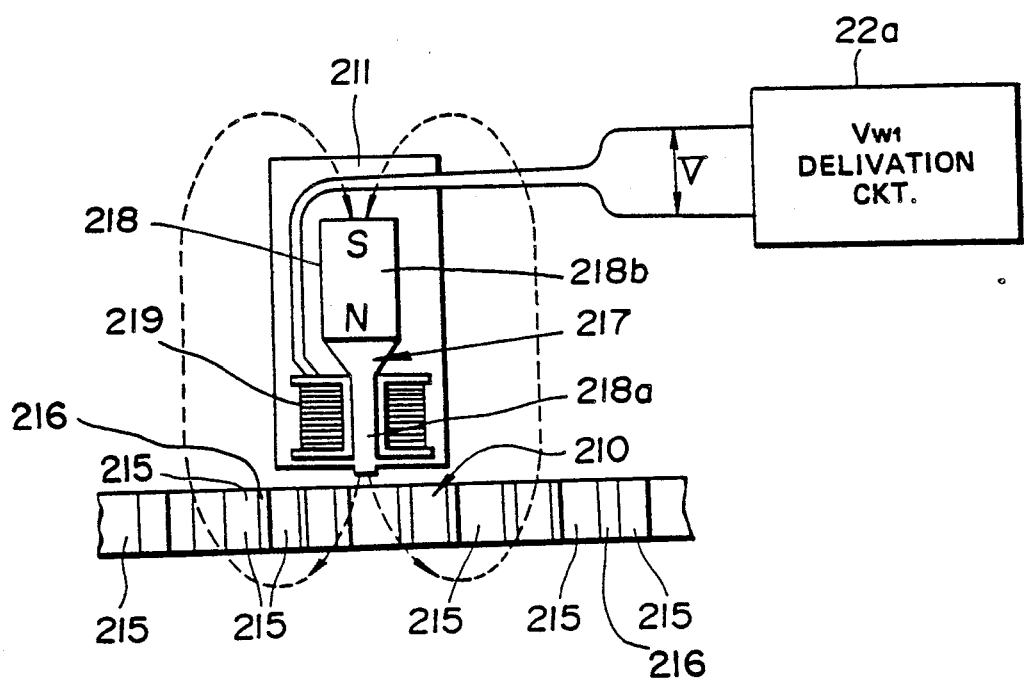
FIG. 4 is an explanatory illustration showing detained construction of the wheel speed sensor of FIG. 2.
Figure 5:
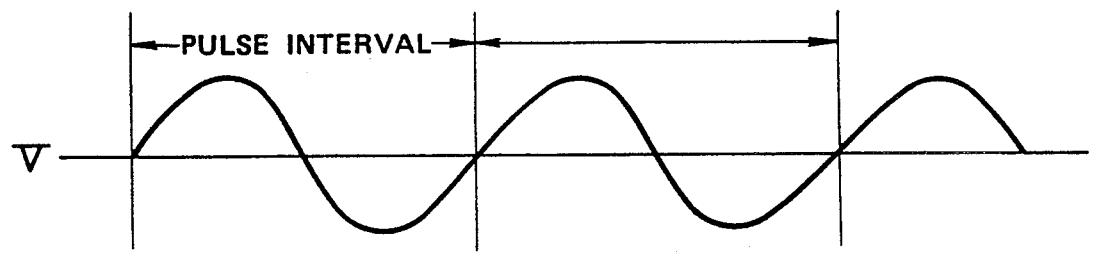
FIG. 5 shows a waveform of the wheel sensor signal.

As shown in FIGS. 3 and 4, the wheel speed sensor 21a generally comprises a sensor rotor 210 rotatable with the associated front-right wheel 1R, and a sensor assembly 211. The sensor assembly 211 is fixedly secured to a shim portion 212 of a knuckle spindle 213. The sensor rotor 210 is fixedly secured to a wheel hub 214 for rotation therewith. As particularly shown in FIG. 4, the sensor rotor 210 is formed with a plurality of sensor teeth 215 at regular angular intervals. The width of the teeth 215 and the grooves 216 therebetween are equal in the shown embodiment and define to a unit angle of wheel rotation. The sensor assembly 211 comprises a magnetic core 217 aligned with its north pole (N) near the sensor rotor 210 and its south popie (S) distal from the sensor rotor. A metal element 218 with a smaller diameter section 218a is attached to the end of the magnetic core 217 nearer the sensor rotor. The free end of the metal element 218 faces the sensor teeth 215. An electromagnetic coil 219 encircles the smaller diameter section 218a of the metal element 218. The electromagnetic coil 219 is designed to detect variations in the magnetic field generated by the magnetic core 217 to produce an alternating-current sensor signal as shown in FIG. 5. That is, the metal element 218 and the magnetic core 217 form a kind of proximity switch which adjusts the magnitude of the magnetic field depending upon the distance between the free end of the metal element 218 and the sensor rotor surface. Thus, the intensity of the magnetic field fluctuates in relation to the passage of the sensor teeth 215 and according in relation to the angular velocity of the wheel.

Figure 6:
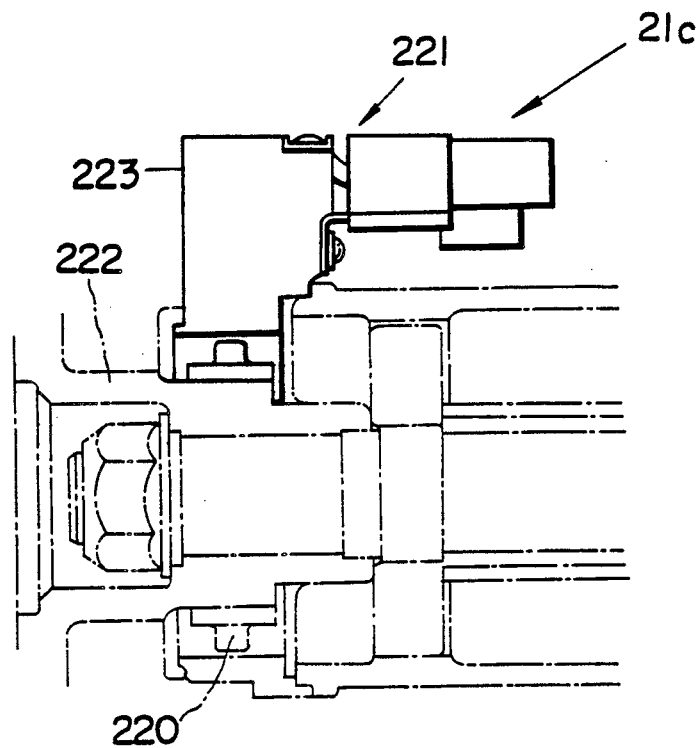
FIG. 6 is an explanatory illustration showing the wheel speed sensor for monitoring an average rotation of rear wheels.

It should be noted that the wheel speed sensors 21b for monitoring rotation speed of the front-left wheel 1L has identical structure as that of the aforementioned wheel sensor 21a for the front-right wheel 1R. On the other hand, the wheel spped sensor 21c is desigened to monitor the rotation speed of the propeller shaft 7a. As shown in FIG. 6, the wheel speed sensor 21c for monitoring the average rear wheel speed $V_{w3}$ comprises a sensor rotator 220 and a sensor assembly 221. The sensor rotor 220 is associated with a companion flange 222 which is, in turn, rigidly secured to the propeller shaft 7a for rotation therewith. The sensor asembly 221 is fixed to the rear differential gear assembly housing 223 (not shown). The sensor assembly 221 for picking up angular displacement of the propeller shaft 7a and producing the alternating-current will be identical to that in the front-left wheel speed sensor 21a.

The wheel speed derivation circuits 22a, 22b and 22c receive the alternating-current sensor signals from respectively associated wheel speed sensors 21a, 21b and 21c and derive rotation speed, $V_{w1}$, $V_{w2}$ and $V_{w3}$ based on the frequency of the alternating-current sensor signals from the associated wheel speed sensors and radius of the corresponding wheels. Wheel speed derivation circuits 22b and 22c also receive the alternating current sensor signals from respectively associated wheel speed sensors 21b and 21c for deriving wheel speed $V_{w2}$ and $V_{w3}$.

Based on the result of arithmetic operation for deriving the wheel speed $V_w$, the wheel speed derivation circuits 22a, 22b and 22c feed wheel speed indicative signals to the subtracting circuit 24 and the wheel acceleration derivation circuit 23 via the selector switch 41. The detailed construction and function of the selector switch 41 will be described later.

The wheel acceleration derivation circuit 23 derives a wheel acceleration $a_w$ based on variation of the value of the wheel speed indicative signal input through the selector switch 41. The wheel acceleration $a_w$ can be derived by differentiating the wheel speed indicative signal values or, in the alternative, in the manner described in the European Patent First Publication No. 01 23 280. The disclosure of the aforementioned European Patent First Publication is herein incorporated by reference. The wheel acceleration derivation circuit 23 produces a wheel acceleration indicative signal indicative of the wheel acceleration $a_2$. The wheel acceleration derivation circuit 23 feeds the wheel acceleration indicative signal to the comparators 18 and 19.

As set forth above, the comparator 18 receives the wheel acceleration indicative signal through the inverting input terminal. The comparator 18 receives the deceleration reference signal indicative of the deceleration threshold $-b$ from a deceleration reference signal generator. The comparator 18 is responsive to the wheel acceleration indicative signal value $a_w$ being smaller than the deceleration reference signal value $-b$ to output the comparator signal having a logical HIGH level. The comparator 18 produces the comparator signal with the logical LOW level as long as the wheel acceleration indicative signal value $a_w$ is smaller than or equal to the deceleration reference signal value $-b$.

The comparator 19 receives the wheel acceleration indicative signal through the non-inverting input terminal thereof. The inverting input terminal of the comparator 19 is connected to an acceleration reference signal generator to receive therefrom an acceleration threshold $+a$. The comparator 19 compares the wheel acceleration indicative signal value $a_w$ with the acceleration reference signal value $+a$ so as to produce the comparator signal with the logical HIGH level when the wheel acceleration indicative signal value is greater than the acceleration reference signal value. The comparator 19 produces the comparator signal with the logical LOW level as long as the wheel acceleration indicative signal value is held smaller than or equal to the acceleration reference signal value.

The subtracting circuit 24 receives the wheel speed indicative signal selected by the selector switch 41. Also, the substracting circuit 24 receives a predetermined acceptable wheel spinning magnitude indicative value $\Delta V_w$. The acceptable wheel spinning magnitude indicative value $\Delta V_w$ represents a spinning magnitude slightly greater than an inevitable slip caused in power train. The subtracting circuit 24 subtracts the acceptable wheel spinning magnitude indicative value $\Delta V_{w1}$ from the wheel speed indicative signal value $V_w$. The subtracting circuit 24 produces an acceptable wheel speed indicative signal indicative of the resultant of subtraction $(V_{w1} - \Delta V_{w1})$.

Therefore, the subtracting circuit 24 derives an acceptable wheel speed indicative signal value $V_{wref}$ $(=V_{w1} - \Delta V_{w1})$, which represents an acceptable minimum wheel speed to be regarded as the condition at which no wheel spinning occurs. The acceptable wheel speed indicative signal is input to the comparator 20 through its non-inverting input terminal. The inverting input terminal of the comparator 20 is connected to the select-LOW switch 39. The select-LOW switch 39 is connected to a select-LOW switch 25. On the other hand, the select-LOW switch 25 is connected to the wheel speed derivation circuits 22a, 22b and 22c for receiving therefrom the wheel speed indicative signals indicative of the wheel speeds $V_{w1}$, $V_{w2}$ and $V_{w3}$ of the associated wheels 1L, 1R, 2L and 2R.

Here, it is assumed that the actual vehicle speed may be close to the corresponding value derived from the minimum wheel speed value $V_{w1}$, $V_{w2}$ and $V_{w3}$ among the wheel speeds of four wheels. Therefore, the select-LOW switch 25 selects the wheel speed indicative signal having the minimum value among the four inputs thereof. The select-LOW switch 25 thus passes only one wheel speed indicative signal having the minimum value to the select-LOW switch 39. The wheel speed indicative signal selected by the select-LOW switch 25 will be hereafter referred to as the "minimum wheel speed indicative signal" and the value indicated in the minimum wheel speed indicative signal will be hereafter referred to as the "minimum wheel speed value $V_{WL}$". The minimum wheel speed indicative signal from the select-LOW switch 25 is also fed to the projected wheel speed derivation circuit 40. The projected wheel speed derivation circuit 40 derives a projected vehicle speed $V_i$ based on the minimum wheel speed indicative signal.

It should be appreciated that the projected vehicle speed $V_i$ is a value corresponding to the wheel speed at the projected vehicle speed arithmetically obtained regardless of wheel spinning and, in other words, derived by setting the wheel spinning magnitude to zero.

The projected vehicle speed derivation circuit 40 produces a projected vehicle speed indicative signal having a value $V_i$ representative of the projected vehicle speed corresponding wheel speed value. The projected vehicle speed indicative signal is also fed to the select-LOW switch 39. The select-LOW switch 39 compares the minimum wheel speed indicative signal value with the projected vehicle speed indicative signal value for selected one of two signal having smaller than the other. One of the minimum wheel speed indicative signal and the projected vehicle speed indicative signal selected by the select-LOW switch 39 is output as a vehicle speed $V_{iw}$ indicative signal. This vehicle speed $V_{iw}$ indicative signal serves as a vehicle speed reference signal. The vehicle speed reference signal value $V_{iw}$ is compared with the acceptable wheel spaced indicative value $V_{wref}$ $(=V_{w1} - V_{w1})$ of the subtraction circuit 24 in the comparator 20. The comparator 20 generates logical HIGH level comparator signal when the subtraction circuit output is greater than or equal to the vehicle speed reference signal value $V_{iw}$. This means that the wheel speed of the right-front wheel 1R is higher than a possible wheel speed $(V_{iw} + \Delta V_{w1})$ corresponding to the vehicle speed. In this case, wheel-spinning caused on the front-right wheel 1R is detected.

Figure 7:
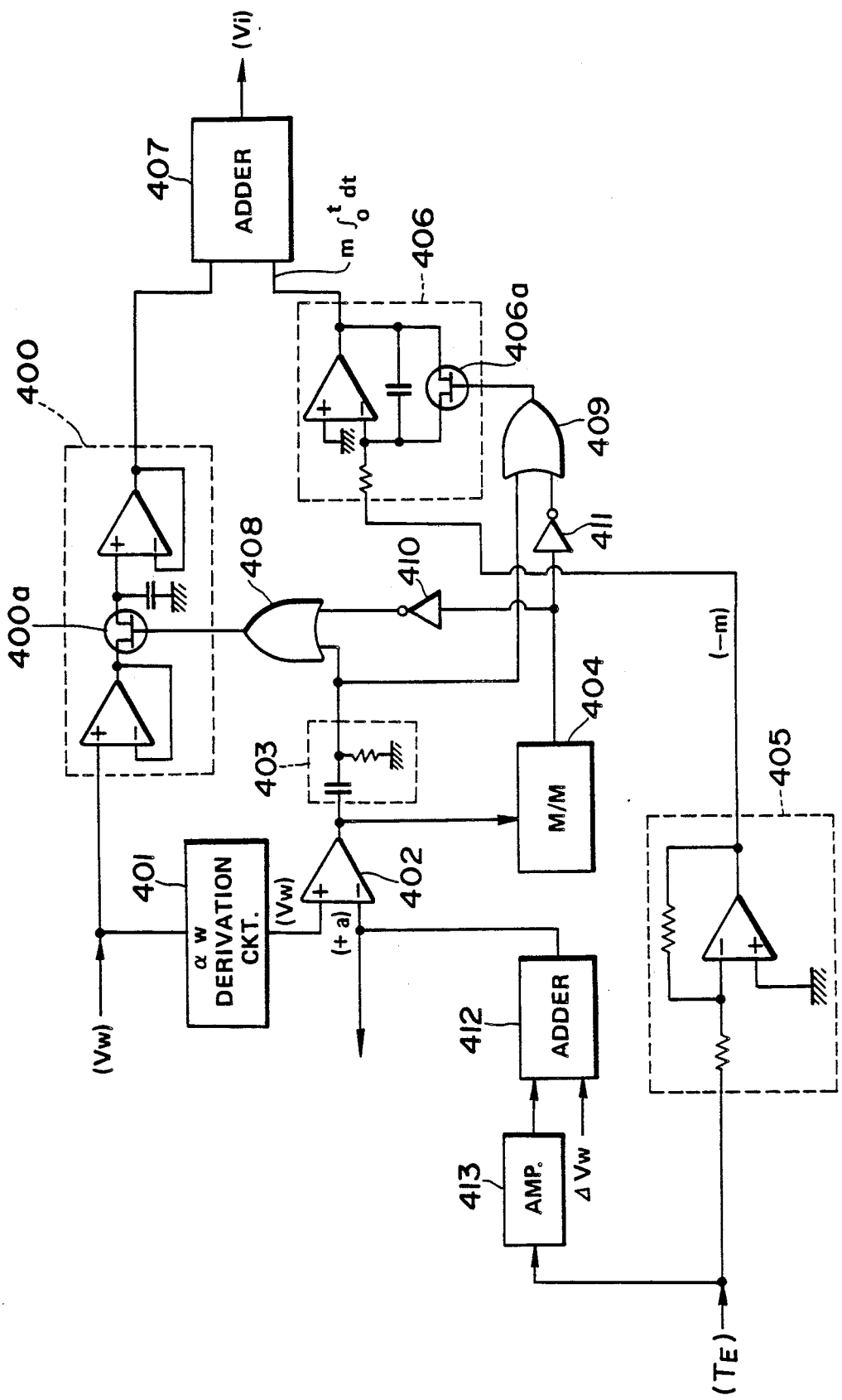
FIG. 7 is a block diagram showing the detail of the preferred embodiment of the wheel slippage derivation system in the traction control system of FIG. 1.

FIG. 7 shows the deail of the projected vehicle speed derivation circuit 40 in the preferred embodiment of the traction control system. The projected vehicle speed derivation circuit 40 generally comprises a sample/hold circuit 400, a wheel acceleration derivation circuit 401, a comparator 402, a differentiating circuit 403, a monostable multivibrator 404, an integrator circuit 406, an adder 407, OR gates 408 and 409 and inverter circuits 410 and 411.

The sample/hold circuit 400 receives the minimum wheel speed indicative signal from the select-LOW switch 25 and samples the same. The sample/hold circuit 400 is connected to a switching transistor 400and responsive to turning ON of the latter in response to a shot-pulse to hold the minimum wheel speed indicative signal value $\overline{V_w}$. The sample/hold circuit 400 produces a held minimum wheel speed indicative signal based on the held value $V_w$ and feeds to the adder 407.

The wheel acceleration derivation, circuit 401 derives a wheel acceleration $\overline{\alpha_w}$ based on the minimum wheel speed indicative signal values $\overline{V_w}$. The wheel acceleration derivation circuit 401 produces an wheel acceleration $\overline{\alpha_w}$ indicative signal based on the derived wheel acceleration $\overline{\alpha_w}$. The wheel acceleration $\overline{\alpha_w}$ indicative signal is fed to a non-inverting input terminal of the comparator 402. The comparator 402 is, on the other hand, connected to the acceleration reference signal generator to receive therefrom the acceleration threshold $+a$ at inverting input terminal thereof.

The comparator 402 compares the wheel acceleration $\alpha_w$ with the acceleration threshold $+a$ to produce a comparator signal. The logical level of the comparator signal of the comparator 402 becomes HIGH when the wheel acceleration $\alpha_w$ is greater than the acceleration threshold $+a$, and otherwise becomes LOW. The HIGH level comparator signal of the comparator 402 triggers the monostable multivibrator 404 and the differentiation circuit 403. The differentiation circuit 403 generates the shot-pulse in response to the leading edge of the HIGH level comparator signal. On the other hand, the monostable multivibrator 404 generates HIGH level signal for a given period of time.

The integrator 406 has a switching transistor 406a which is turned ON in response to HIGH level gate signal of the OR gate 409. The integrator circuit 406 is reset in response to turning ON of the switching transistor to clear the integrated value thereof. On the other hand, the integrator circuit 406 integrates a variable m from a coefficient m generator 405.

The coefficient m generator may comprise an inverting amplifier 405. The variable $-m$ of the inVerting amplifier 405 varies depending upon the driving torque on the wheels. By employing driving torque depending feature in derivation of the coefficient m, variation rate of the approximated vehicle speed value according to the elapsed time can be varied in relation to road friction. This makes derivation of the approximated vehicle speed value $V_i$ more precise.

The integrator circuit 406 produces an integrator signal indicative of an integrated value $m \int_0^t dt$ and feed to the adder 407. The adder 407 receives the held minimum wheel speed indicative signal and the integrator signal to obtain a sum value thereof. The output of the adder 407 serves as the projected vehicle speed $V_i$.

Figure 8:
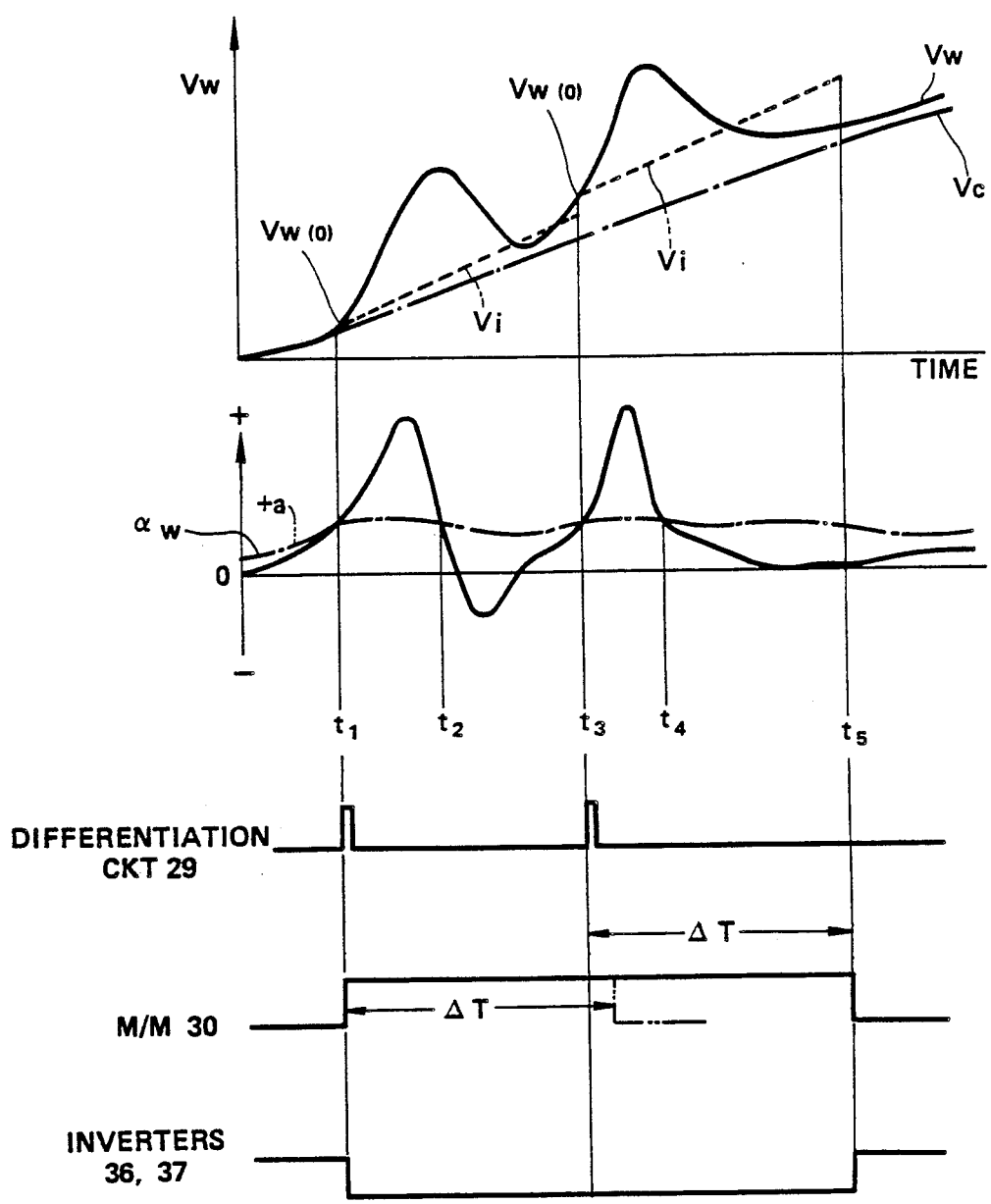
FIG. 8 is a timing chart showing operation of the preferred embodiment of the wheel slippage derivation system of FIG. 7.

In the arrangement set forth above, derivation process of the projected vehicle speed $V_i$ will be described with reference to FIG. 8. It is assumed that, when the minimum wheel speed $\overline{V_w}$ varies as shown by the solid line in FIG. 8, the vehicle speed $V_c$ varies as shown in the phantom line in FIG. 8. In this case, the wheel acceleration $\overline{a_w}$ derived from the minimum wheel speed $\overline{V_w}$ varies across the acceleration threshold $+a$ at times $t_1$, $t_2$, $t_3$, $t_4$. As will be seen from FIG. 8, the Wheel acceleration $a_2$ is held above the acceleration threshold $+a$ during the period $t_1$ to $t_2$ and $t_3$ to $t_4$. Therefore, the signal level of the comparator signal of the comparator 402 is held HIGH during the period $t_1$ to $t_2$ and $t_3$ to $t_4$. In response to the leading edge of the HIGH level comparator signal of the comparator 402, the monostable multivibrator 404 is triggered for the given period of time $\Delta T$. The monostable multivibrator 404 is re-triggered by every leading edge of the HIGH level comparator signal. Therefore, in the shown example, the monostable multivibrator is re-triggered at the time $t_3$ in response to the leading edge of the HIGH level comparator signal produced at the time $t_3$. Therefore, the given period of time $\Delta T$ is renewed and therefor HIGH level output of the monostable multivibrator 404 is maintained for the period $\Delta T$ from the time $t_3$. In the shown embodiment, the given period $\Delta T$ ends at a time $t_5$. Therefore, the output of the monostable multivibrator 404 turns LOW level at the time $t_5$. The HIGH level output of the monostable multivibrator 404 is inverted by the invertor circuits 410 and 411 and supplied to the OR gates 408 and 409. Therefore, while the output level of the monostable multivibrator 404 is held HIGH, the input to the OR gates 408 and 409 from the monostable multivibrator 404 is maintained LOW level.

On the other hand, the differentiation circuit 403 is also responsive to the leading edge of the HIGH level comparator signal of the comparator 402. The differentiation circuit 403 generates a shot-pulse as triggered by the leading edge of the HIGH level comparator signal. The shot-pulse is fed to the OR gates 408 and 409. The gate signals of the OR gates 408 and 409 turns HIGH in response to the shot-pulse to turn the switching transistors 400a and 406a of the sample/hold circuit 400 and the integration circuit 406 ON. Therefore, the SWitching transistors 400a and 406a are turned on substantially at the time $t_1$ and $t_3$.

As set forth, the sample/hold circuit 400 is responsive to turning ON of the switching transistor 400a to hold the instantaneous minimum wheel speed value $\overline{V_w}$. Therefore, the minimum wheel speed value $\overline{V_w}$ is held at the times $t_1$ and $t_3$. Simultaneously, the integration circuit 406 is reset in response to turning ON of the switching transistor 406a. As reset, the integration circuit 406 re-starts integrating operation for integrating the variable m from the coefficient m generator 405. As will be appreciated that the integrated value $m \int_0^t dt$ represents expected wheel speed variation in an elapsed time from the times $t_1$ and $t_3$. The sum of the held minimum wheel speed value $V_w$ and the integrated value $m \int_0^t dt$ thus represents projected instantaneous vehicle $V_i$ at each moment.

On the other hand, at the time $t_5$, the output level of the monostable multivibrator 404 becomes LOW since no HIGH level comparator signal is input within the given trigger period $\Delta T$ of the monostable multivibrator from the $t_3$. As a result, the inputs to the OR gates 408 and 409 through the inverters 410 and 411 become HIGH. On the other hand, the differentiation circuit 403 is maintained in non-triggered state due to absence of the HIGH level comparator signal from the comparator 402 after the time $t_3$. As a result, the gate signals of the OR gates 408 and 409 are maintained HIGH level by the HIGH level inputs from the monostable multivibrator 404 as inverted by the inverters 410 and 411. As a result, the switching transistors 400a and 406a are held ON.

By maintaining the switching transistor 400a ON, the sample/hold circuit 400 passes the instantaneous minimum wheel speed values $\overline{V_w}$ from moment to moment. Therefore, the instantaneous minimum wheel speed at $\overline{V_w}$ at each moment is input to the adder. At the same time, since the switching transistor 406a is held ON, the integration circuit 406 is maintained reset state. Therefore, the integrated value $m \int_0^t dt$ is maintained zero. Therefore, the output of the adder 407 to serve as the projected vehicle speed $V_i$ identical to the minimum wheel speed $\overline{V_w}$ input from the sample/hold circuit 400.

Figure 9:
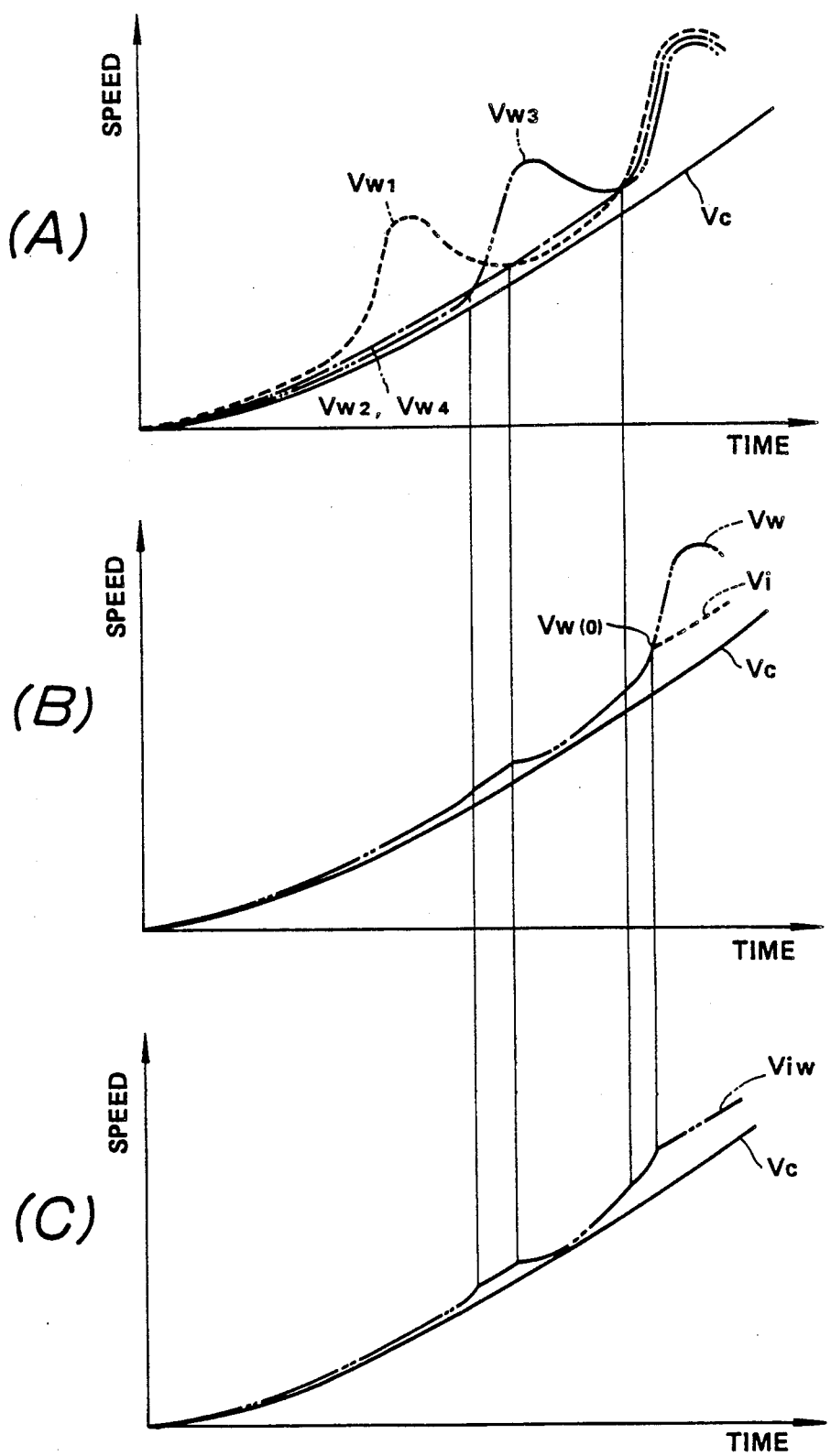
FIG. 9 shows relationship between a vehicle speed and a wheel speed

When the wheel speeds $V_{w1}$, $V_{w2}$ and $V_{w3}$ of the front-right, front-left, rear-right and rear-left wheels 1R, 1L, 2R and 2L vary as shown in FIG. 9, the select-LOW switch 58 selects the minimum value among the four wheel speed values. During the period I (shown in FIG. 9(B)), the wheel speed $V_{w3}$ has the smallest value in comparison with other wheel speeds and $V_{w1}$ and $V_{w2}$. Therefore, during this period I, the wheel speed value $V_{w3}$ is taken as the minimum wheel speed value $\overline{V_w}$. In the period II, the wheel speed $V_{w3}$ becomes higher than the wheel speed $V_{w2}$. Therefore, during the period II, the wheel speeds $V_{w2}$ is taken as the minimum wheel speed $\overline{V_w}$. Furthermore, in the period III, the wheel speed $V_{w1}$ drops below the wheel speeds $V_{w2}$ and $V_{w3}$, therefor, the wheel speed $V_{w1}$ is taken as the minimum wheel speed value $\overline{V_w}$. In the period IV, the wheel speed $V_{w3}$ again becomes smallest. Therefore, in this period IV, the wheel speed value $V_{w3}$ of the rear-right wheel 2R is taken as the minimum wheel speed $\overline{V_w}$.

As set forth above, the projected vehicle speed $V_i$ derivation circuit derives the projected vehicle speed $V_i$ on the minimum wheel speed $V_w$ selected as set forth above and the driving torque signal from the adder 41. The projected vehicle speed $V_i$ with the minimum wheel speed value $V_w$ in the select-LOW switch 39. The select-LOW switch 39 selects one of the smaller value than the other to output the vehicle speed reference signal having a value $V_{iw}$ corresponding selected one of the projected vehicle speed $V_i$ and the minimum wheel speed $V_w$. As set forth above, the vehicle speed reference signal thus derived is fed to the comparators 20a, 20b, 20c and 20d from the select-LOW switch 39.

Returning to FIG. 1, the selector switch 41 has three input terminals respectively connected to the wheel speed derivation circuits 22a, 22b and 22c. The selector switch 41 also has another three input terminals connected to AND gates 60, 61 and 62. The AND gate 60 is connected to a comparator 63 at one input terminal. The other input terminal of the AND gate 60 is connected to a comparator 64. Non-inverting input terminals of the comparators 63 and 64 are connected to the select-LOW switch 25 to receive the minimum wheel speed $V_w$ indicative signal therefrom. On the other hand, the inverting input terminal of the comparator 65 is connected to a vehicle speed threshold $V_2$ generator to receive therefrom a given value $V_2$ of a second vehicle speed threshold. The inverting input terminal of the comparator 64 is connected to a vehicle speed threshold $V_1$ generator to receive therefrom a given value $V_1$ of a first vehicle speed threshold. In the shown embodiment, the second vehicle speed threshold $V_2$ represents a predetermined high vehicle speed criterion and the first vehicle speed threshold $V_1$ represents a predetermined low vehicle speed criterion. Therefore, when the vehicle speed as represented by the minimum wheel speed $\overline{V_w}$ is higher than or equal to the second vehicle speed threshold, it is regarded that the vehicle is driven in high speed range. On the other hand, when the vehicle speed as represented by the minimum wheel speed $\overline{V_w}$ is lower than the second vehicle speed threshold, it is regarded that the vehicle is driven in low speed range. When the vehicle speed as represented by the minimum wheel speed $\overline{V_w}$ is in a range of lower than to the second vehicle speed threshold $V_2$ and higher than or equal to the first vehicle speed threshold $V_1$, it is regarded that the vehicle speed is in a intermediate speed range.

The AND gate 61 is connected to the comparator 63 at its inverting input terminal. The other input terminal of the AND gate 61 is connected to the comparator 64. AND gate has two inverting input terminals respectively connected to the comparators 64 and 65.

With this arrangement, the output $S_1$ of the AND gate 60 becomes HIGH level when the vehicle is in the high speed range. Similarly, the output $S_2$ of the AND gate 61 becomes HIGH while the vehicle is driven in the intermediate range od vehicle speed. The HIGH level output $S_3$ is output from the AND gate 62 when the vehicle speed is in the low vehicle speed range. The level of the gate signals $S_1$, $S_2$ and $S_3$ of the AND gates 60, 61 and 62 in relation to the vehicle speed can be illustrated by means of the following table.

TABLE

| | $V_w \geqq V_2$ | $V_w > V_2 \geqq V_1$ | $V_w V_w < V_1$ |
|---|---|---|---|
| S1 | 1 | 0 | 0 |
| S2 | 0 | 1 | 0 |
| S3 | 0 | 0 | 1 |

The selector switch 41 is designed to select one of the wheel speed indicative signals having a maximum value among $V_{w1}$, $V_{w2}$ and $V_{w3}$ in response to HIGH level $S_1$ signal from the AND gate 60. Similarly, the selector switch 41 selects the wheel speed indicative signal having an intermediate value among $V_{w1}$, $V_{w2}$ and $V_{w3}$ in response to HIGH level $S_2$ signal from the AND gate 61. In response to the HIGH level $S_3$ signal from the AND gate 62, the wheel speed indicative signal having the smallest value is selected.

Figure 10:
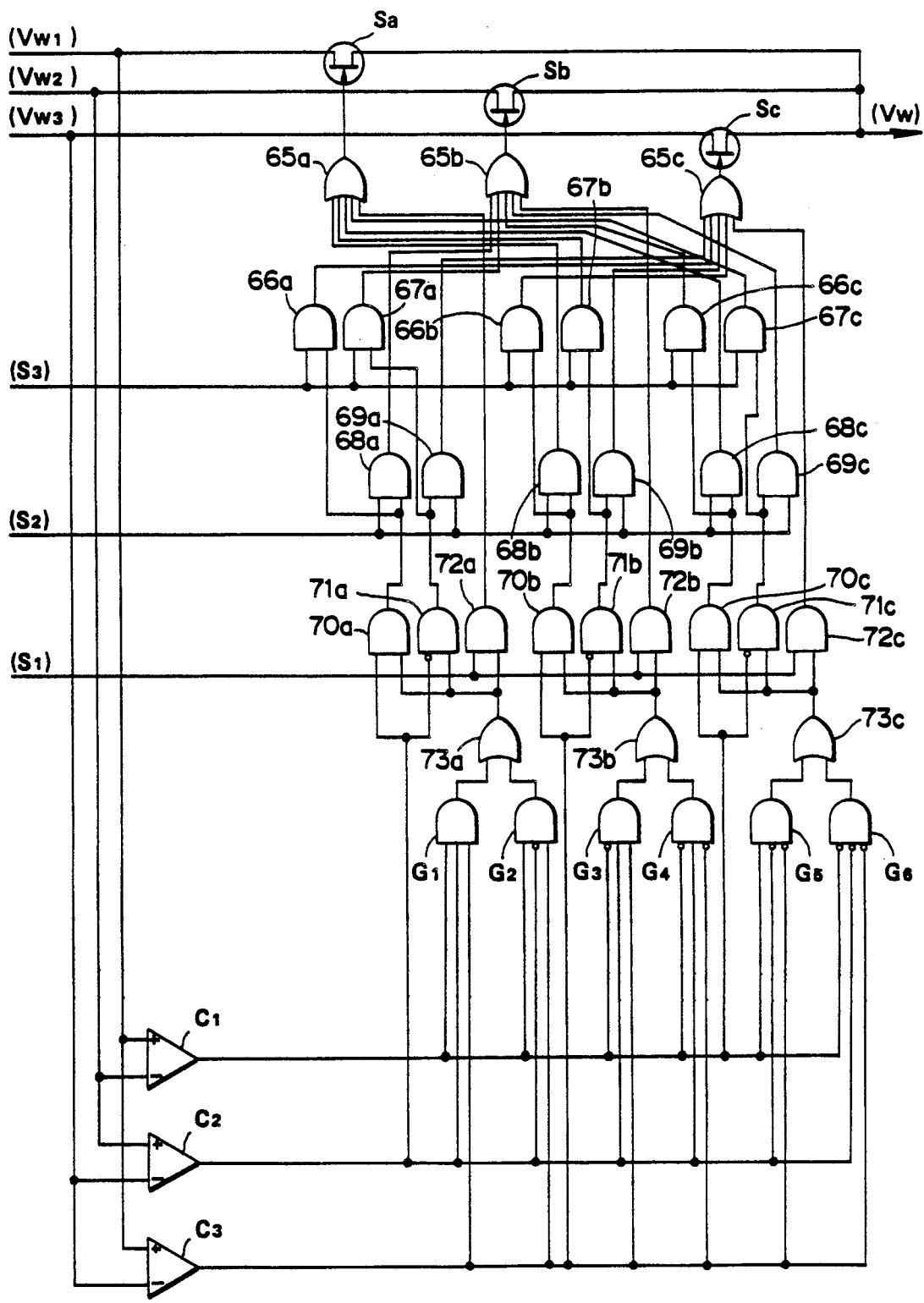
FIG. 10 is a block diagram showing the detail of a selector switch employed in the preferred embodiment of the traction control system of FIG. 1.

FIG. 10 shows one example of the selector switch 41 to be employed in the preferred embodiment of the traction control system of FIG. 1. The selector switch 41 includes switching transistors Sa, Sb and Sc. The switching transistor Sa is interposed between the wheel speed derivation circuit 22a and the output of the selector switch. Therefore, the wheel speed indicative value $V_{w1}$ of the wheel speed derivation circuit 22a is output from the selector switch 41 when the switching transistor Sa is maintained ON. The switching transistor Sb is interposed between the wheel speed derivation circuit 22b and the output of the selector switch. Therefore, the wheel speed indicative value $V_{w2}$ of the wheel speed derivation circuit 22b is output from the selector switch 41 when the switching transistor Sb is maintained ON. The switching transistor Sc is interposed between the wheel speed derivation circuit 22c and the output of the selector switch. Therefore, the wheel speed indicative value $V_{w3}$ of the wheel speed derivation circuit 22c is output from the selector switch 41 when the switching transistor Sc is maintained ON.

Base electrodes of the switching transistors Sa, Sb and Sc are connected to OR gates 65a, 65b and 65c. The OR gate 65a is connected to outputs of AND gates 67b, 67c, 68b, 68c and 72a. The OR gate 65b is connected to outputs of AND gates 67a, 66c 68a, 69c and 72b. The OR gate 65c is connected to 66a, 66b, 69a, 69b and 72c. The AND gates 66a, 67a, 66b, 67b, 66c and 67c are connected to the AND gate 62 to receive the $S_3$ signal at respective one input terminal. The other input terminal of the AND gate 66a is connected to an output on an AND gate 70a. The output of the AND gate is also connected to one input terminal of the AND gate 68a. One input terminal of the AND gate 67a is connected to an output of an AND gate 71, which is, in turn, connected to one input terminal the AND gate 69a. The AND gate 66b is connected to the output of an AND gate 70b at one input terminal, which output of the AND gate 70b, is in turn, connected to the one input terminal of the AND gate 68b. One input terminal of the AND gate 67b is connected to the output of an AND gate 71b. The output od the AND gate 71b is also connected to one input terminal of the AND gate 69b. The AND gate 66a is connected to the output of an AND gate 70c, which is, in turn, connected to one input terminal of the AND gate 68c. Similarly, one input terminal of the AND gate 67c is connected to the output of an AND gate 71c. The output of the AND gate 71c is also connected to one input terminal of the AND gate 69c.

The other input terminals of the AND gates 68a, 69a, 68b, 69b, 68c and 69c are connected to the AND gate 61 to receive therefrom the $S_2$ signal.

The AND gate 70a is connected to the output terminal of a comparator $C_2$ at one input terminal. The other input terminal is connected to an OR gate 73a. The OR gate 73a is also connected to the AND gates 71a and 72a. The AND gate 71a has an inverting input terminal connected to the comparator $C_2$. The AND gate 72a is connected to the AND gate 60 to receive therefrom the $S_1$ signal. The AND gate 70b is connected to the output terminal of a comparator $C_3$ at one input terminal. The other input terminal is connected to an OR gate 73b. The OR gate 73b is also connected to the AND gates 71b and 72b. The AND gate 71b has an inverting input terminal connected to the comparator $C_3$. The AND gate 72b is connected to the AND gate 60 to receive therefrom the $S_1$ signal. The AND gate 70c is connected to the output terminal of a comparator $C_1$ at one input terminal. The other input terminal is connected to an OR gate 73c. The OR gate 73c is also connected to the AND gates 71c and 72c. The AND gate 71c has an inverting input terminal connected to the comparator $C_1$. The AND gate 72c is connected to the AND gate 60 to receive therefrom the $S_1$ signal.

The OR gate 73a is connected to AND gates $G_1$ and $G_2$. The OR gate 73b is connected to AND gates $G_3$ and $G_4$. Similarly, the OR gate 73c is connected to AND gates $G_5$ and $G_6$. The AND gate $G_1$ is connected to output terminals of the comparators $C_1$, $C_2$ and $C_3$. The AND gate $G_2$ is connected to the comparators $C_1$ and $C_3$ through non-inverting input terminals and to the comparator $C_2$ through an inverting input terminal. The AND gate $G_3$ is connected to the comparators $C_2$ and $C_3$ through non-inverting input terminals and to the comparator $C_1$ through an inverting input terminal. The AND gate $G_4$ is connected to the comparators $C_1$ and $C_3$ through inverting input terminals and to the comparator $C_2$ through a non-inverting input terminal. The AND gate $G_5$ is connected to the comparators $C_2$ and $C_3$ through inverting input terminals and to the comparator $C_1$ through a non-inverting input terminal. The AND gate $G_6$ has three inverting input terminals respectively connected to the output terminals of the comparators $C_1$, $C_2$ and $C_3$.

The comparator $C_1$ is connected to the wheel speed derivation circuit 22a at a non-inverting input terminal to receive therefrom the wheel speed indicative signal having the value $V_{w1}$ and to the wheel speed derivation circuit 22b at an inverting input terminal to receive therefrom the wheel speed indicative signal having the value $V_{w2}$. The comparator $C_2$ is connected to the wheel speed derivation circuit 22b at a non-inverting input terminal to receive therefrom the wheel speed indicative signal having the value $V_{w2}$ and to the wheel speed derivation circuit 22c at an inverting input terminal to receive therefrom the wheel speed indicative signal having the value $V_{w3}$. The comparator $C_3$ is connected to the wheel speed derivation circuit 22a at a non-inverting input terminal to receive therefrom the wheel speed indicative signal having the value $V_{w1}$ and to the wheel speed derivation circuit 22c at an inverting input terminal to receive therefrom the wheel speed indicative signal having the value $V_{w3}$.

With the foregoing arrangement, the comparator signals of the comparators $C_1$, $C_2$ and $C_3$ and the gate signals of the AND gates $G_1$, $G_2$, $G_3$, $G_4$, $G_5$ and $G_6$ varies depending on the different of valuws $V_{w1}$, $V_{w2}$ and $V_{w3}$ as shown in the following table.

TABLE

| | $C_1$ | $C_2$ | $C_3$ | $G_1$ | $G_2$ | $G_3$ | $G_4$ | $G_5$ | $G_6$ |
|---|---|---|---|---|---|---|---|---|---|
| $V_{w1} > V_{w2} > V_{w3}$ | 1 | 1 | 1 | 1 | 0 | 0 | 0 | 0 | 0 |
| $V_{w1} > V_{w3} > V_{w2}$ | 1 | 0 | 1 | 0 | 1 | 0 | 0 | 0 | 0 |
| $V_{w2} > V_{w1} > V_{w3}$ | 0 | 1 | 1 | 0 | 0 | 1 | 0 | 0 | 0 |
| $V_{w2} > V_{w3} > V_{w1}$ | 0 | 1 | 0 | 0 | 0 | 0 | 1 | 0 | 0 |
| $V_{w3} > V_{w1} > V_{w2}$ | 1 | 0 | 0 | 0 | 0 | 0 | 0 | 1 | 0 |
| $V_{w3} > V_{w2} > V_{w1}$ | 0 | 0 | 0 | 0 | 0 | 0 | 0 | 0 | 1 |

On the other hand, depending upon the difference of the wheel speed indicative signal values $V_{w1}$, $V_{w2}$ and $V_{w3}$ and the AND gate outputs $S_1$, $S_2$ and $S_3$, the position of the switching transistors Sa, Sb and Sc varies as shown in the following table.

TABLE

| | $S_1 = 1$ | | | $S_2 = 1$ | | | $S_3 = 1$ | | |
|---|---|---|---|---|---|---|---|---|---|
| | Sa | Sb | Sc | Sa | Sb | Sc | Sa | Sb | Sc |
| $V_{w1} > V_{w2} > V_{w3}$ | ON | — | — | — | ON | — | — | — | ON |
| $V_{w1} > V_{w3} > V_{w2}$ | ON | — | — | — | — | ON | — | ON | — |
| $V_{w2} > V_{w1} > V_{w3}$ | — | ON | — | ON | — | — | — | — | ON |
| $V_{w2} > V_{w3} > V_{w1}$ | — | ON | — | — | — | ON | ON | — | — |
| $V_{w3} > V_{w1} > V_{w2}$ | — | — | ON | ON | — | — | — | ON | — |
| $V_{w3} > V_{w2} > V_{w1}$ | — | — | ON | — | ON | — | ON | — | — |

FIG. 11 shows a timing chart showing the operation of the preferred embodiment of the traction control system of FIG. 1. In the example of FIG. 11, it is assumed that all of front-right wheel 1R, front-left wheel 1L, rear-right wheel 2R and rear-left wheel 2L rotate in synchronism with others at substantially the same rotation speed. Therefore, the wheel speed $V_w$ and the one of the wheel speed indicative value $V_{w1}$, $V_{w2}$ and $V_{w3}$ as selected by the selector switch 41 would become the identical value.

In the shown example, the wheel acceleration $a_w$ the acceleration threshold +a at times $t_{11}$, $t_{13}$, $t_{17}$ and $t_{19}$. Therefore, at every times $t_{11}$, $t_{13}$, $t_{17}$ and $t_{19}$, the comparator signal level of the comparator 402 of the projected vehicle speed derivation circuit 40 becomes HIGH. Therefore, the monostable multivibrator 404 is triggered to produce the HIGH level outputs every times $t_{11}$, $t_{13}$, $t_{17}$ and $t_{19}$ in response to the leading edge of the HIGH level comparator signal. At the same time, the differentiation circuit 403 is triggered to output the shot-pulses at the times $t_{11}$, $t_{13}$, $t_{17}$ and $t_{19}$. Therefore, as set forth above, the wheel speed at the times $t_{11}$, $t_{13}$, $t_{17}$ and $t_{19}$ are held in the sample/hold circuit 400 of the projected vehicle speed derivation circuit 40. Therefore, after the times $t_{11}$, $t_{13}$, $t_{17}$ and $t_{19}$, the projected vehicle speed derivation circuit 40 outputs the arithmetically obtained projected vehicle speed $V_i$ indicative signal for the given period of time $\Delta T$. The projected vehicle speed $V_i$ indicated in the projected vehicle speed indicative signal is then compared with the wheel speed $V_w$ in the select-LOW switch 59. The select-LOW siwtch 39 selects smaller one of the projected vehicle speed $V_i$ and the wheel speed $V_w$ to output the vehicle speed reference signal indicative thereof. The vehicle speed reference signal is input to the comparators 20.

The comparators 20 compares the wheel speed $V_w$ with a sum of the vehicle speed reference value $V_{iw}$ and the aforementioned given value $\Delta V_w$. The comparator 20 produces HIGH level comparator signal while the wheel speed $V_w$ is greater than or equal to the sum value $(V_{iw} + \Delta V_w)$.

On the other hand, the comparator 18 compares the wheel acceleration $a_w$ derived by the wheel acceleration derivation circuit 23 with the deceleration threshold $-b$. The comparator signal of each comparator 18a, 18b, 18c and 18d is maintained LOW while the wheel acceleration $a_w$ is greater than the deceleration threshold $-b$. In the shown example, the wheel acceleration $a_w$ decreases across the deceleration threshold $-b$ at a time $t_{15}$ and increases across the deceleration threshold at a time $t_{16}$. Therefore, the comparator signal of the comparator 18 turns HIGH level at the time $t_{15}$ and maintained at HIGH level until the time $t_{16}$. Similarly, the comparator 19 compares the wheel acceleration $a_w$ with the acceleration threshold +a. The signal level of the comparator signal of the comparator 19 is maintained LOW while the wheel acceleration is held lower than the acceleration threshold and turns HIGH when the wheel acceleration increases higher than or equal to the acceleration threshold. The wheel acceleration increases across the acceleration threshold +a at times $t_{10}$, $t_{11}$, $t_{13}$, $t_{17}$ and $t_{19}$. The comparator signal of the comparator 19 is maintained HIGH level while the wheel acceleration $a_w$ is maintained higher than or equal to the acceleration threshold +a.

The comparator signal of the comparator 18 and comparator 20 is input to the associated AND gate 16. Therefore, the gate signal level of the AND gate 16 becomes HIGH while the comparator signal of the comparator 18 is held LOW and the comparator signal of the comparator 20 is maintained HIGH level. Similarly the comparator signal 18 is fed to the OR gate 15. On the other hand, another input of the OR gate 15 is connected to the output terminal of the AND gate 17. The AND gate 17 outputs HIGH level gate signal when the gate signal of the AND gate 16 is held LOW and the comparator signal of the comparator 19 is held HIGH. Namely, the gate signal of the AND gate 17 is held HIGH when the wheel speed $V_w$ input from the select-LOW switch 39 is greater than or equal to the output $(V_w - \Delta V_w)$ and wheel acceleration $\alpha_w$ is greater than or equal to the acceleration threshold $+a$.

On the other hand, the gate signal of the OR gate 15 becomes HIGH level when the gate signal of the AND gate 17 is HIGH and/or the comparator signal of the comparator 18 is HIGH. Therfore, the gate signal of the OR gate 15 becomes HIGH when the wheel speed $V_w$ from the select-LOW switch 39 is greater than or equal to the subtractor output $(V_w - \Delta V_w)$ and wheel acceleration $\alpha_w$ is greater than or equal to the acceleration threshold $+a$, and/or the wheel acceleration $\alpha_w$ is smaller than or equal to the deceleration threshold $-b$. In the shown example, the gate signal of the AND gate 16 is maintained HIGH during the period $t_{14}$ to $t_{15}$ and $t_{20}$ to $t_{21}$. On the other hand, the gate signal of the OR gate 15 becomes HIGH during the period $t_{11}$ to $t_{12}$, $t_{13}$ to $t_{14}$, $t_{15}$ to $t_{16}$, $t_{17}$ to $t_{18}$, $t_{19}$ to $t_{20}$...

The transistors 50 and 52 are turned ON in response to HIGH level gate signal from the AND gate 16. On the other hand, the transistor 53 is turned ON in response to the HIGH level gate signal from the OR gate 15. While the transistors 53, 50 and 52 are maintained OFF, the throttle servo system performs normal accelerator depression magnitude dependent throttle valve control in response to the accelerator position indicative signal from the accelerator position sensor 58.

Figure 12:
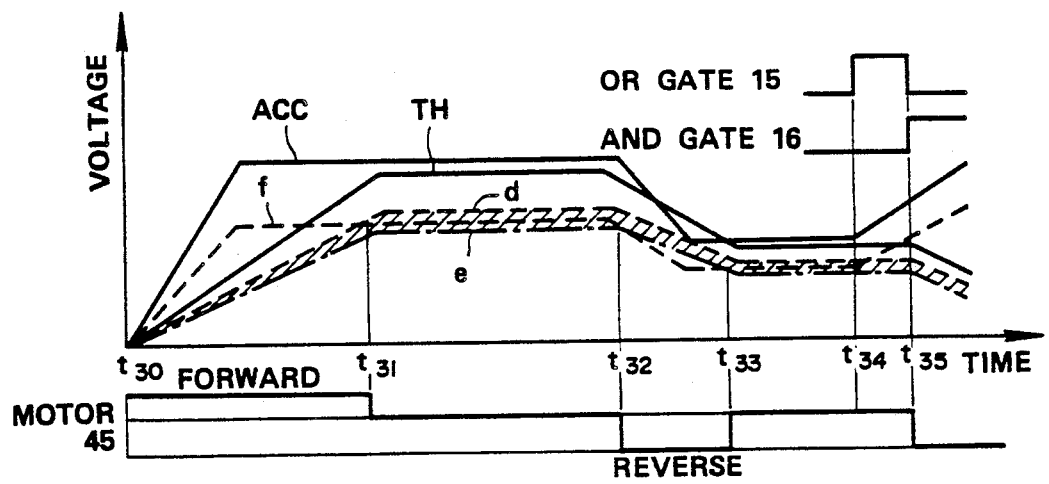
FIG. 12 is a timing chart showing variation of voltage in a throttle servo system in the traction control system of FIG. 1.

In the normal control, assuming the accelerator pedal is operated to vary the accelerator position indicative signal voltage ACC as illustrated in FIG. 13, the potential at the junction f between the voltage dividing resistors $R_3$ and $R_4$ varies as illustrated by broken line in FIG. 12. In response to accelerator pedal operation, the throttle valve TH is controlled the angular position by means of the servo system. According to variation of the throttle valve angular displacement as illustrated in FIG. 12, the potential at the junctions d and e varies as shown. At a time $t_{30}$, the accelerator position indicative signal voltage ACC increases as increasing of the depression magnitude of the accelerator pedal 45. Accordingly, the potential at the junction f increases to be higher than the potential at the junction d and e. At this time, the comparator signal of the comparator 51 is maintained LOW level and the comparator signal of the comparator 55 becomes HIGH level. Therefore, the transistor 48 is held OFF to maintain the solenoid 46a deenergized. On the other hand, since the NAND condition is established by the LOW level comparator signal from the comparator 51 and the HIGH level comparator signal from the comparator 54, the gate signal of the NAND gate turns HIGH to turn the transistor 49 ON. As a result, the solenoide 47a is energized to start power supply for the motor 45. At this time, since the solenoid 46a is held deenergized, the relay switch 46 is positioned at the position illustrated by the solid line in FIG. 1. Therefore, the motor 45 is driven in forward direction to increase the throttle valve open angle.

According to increasing of the throttle valve open angle, the throttle valve angular position indicative signal voltage TH increase as illustrated in FIG. 12. Accordingly, the potentials at the junctions d and e increases. Forward direction drive of the motor 45 is maintained even after the increasing of the accelerator depression stops to maintain the accelerator position constant. At a time $t_{31}$, the potential d increases across the potential at the junction f. This causes HIGH level comparator signal from the comparator 51. Since the potential at the junction f is maintained higher than the potential at the junction e, at this time, the HIGH level comparator signal from the comprator 55 is maintained. As a result, the NAND condition is distroyed to turn the gate signal of the NAND gate 54 LOW level. As a result, the transistor 49 is turned OFF to deenergize the solenoid 47a of the relay 47. Therefore, the relay 47 blocks power supply to the motor 45.

At the same time, since the comparator signal of the comparator 51 turns HIGH, the trasistor 48 turns ON to energize the solenoid 46a. Therefore, the relay switch 46 is shifted to the reverse position.

By locking of the power supply to the motor by means of opening of the relay 47, the motor 45 stops driving. Therefore, the throttle valve 42 is held in place. At a time $t_{32}$, the depression to the accelerator is released to return the accelerator pedal 43, according to accelerator pedal returning magnitude, the accelerator position indicative signal voltage ACC decreases. Therefore, the potential at the junction f drops below the potential at the junction e. Therefore, the comparator signal of the comparator 55 turns LOW. This again establishes the NAND condition to cause HIGH level gate signal of the NAND gate. Therefore, the transistor 49 is again turned ON to energize the solenoid 47a. As a result, power supply to the motor 45 is resumed. At this time, since the potential at the junction f is held lower than the potential at the junction d, the comparator signal of the comparator 51 is held LOW. Therefore, the relay switch 46 is held at the reverse position. Therefore, by resuming power supply, the motor 45 is driven in reverse direction to decrease the throttle valve open angle. Reverse direction drive of the motor 45 is maintained even after the accelerator pedal return movement stops to be held constant position until the potential at the junction f becomes greater than the petential at the junction e, at a time $t_{33}$. In response to the potential at the junction f greater than the potential at the junction e, the comparator signal of the comparator 55 turns HIGH to distroy the NAND condition. Therefore, the solenoid 47a is deenergized and thus power supply is ceased. Therefore, the throttle valve 42 is held at the constant angular position.

At a time $t_{34}$, the accelerator depression is again starts to increase the accelerator depression magnitude. It is assumed that wheel spinning is caused by acceleration of the engine speed and increasing of the torque exerted on the wheels, wheel acceleration $\alpha_w$ may become greater than the acceleration threshold $+a$. As a result, the comparator signal of the comparator 19 turns HIGH level to turn the gate signal of the AND gate 17 HIGH level. Therefore, the gate signal of the OR gate 15 turns HIGH at the time $t_{34}$. In response to the HIGH level gate signal from the OR gate 15, the transistor 53 ON. As a result, the base electrode of the transistor 49 is connected to the ground through the collector-emitter path of the transistor 53. Therefore, the transistor 49 is turned OFF to deenergize the solenoid 47a to open the relay 47. Therefore, the power supply to the motor 45 is blocked. This causes stopping of the motor 45. Therefore, the throttle valve 42 is maintained at the angular position immediately before the shutting off of the power supply.

Subsequently, at a time $t_{35}$, the input $(V_w + \Delta V_w)$ at the non-inverting input terminal of the comparator 20 becomes greater than the input $(V_i)$ at the inverting input terminal. Therefore, the comparator signal level of the comparator 20 turns HIGH. It would be appreciate that since the accelerator depression magnitude is increasing, the wheel accleeration $\alpha_w$ is maintained greater than the deceleration threshold $-b$, the comparator signal of the comparator 18 is held LOW level. Therefore, the gate signal of the AND gate 16 turns HIGH. This makes the input to the OR gate from the AND gate 17 LOW to turn the gate signal level of the OR gate 15 LOW. Therefore, the transistors 50 and 52 are turned ON in response to the HIGH level gate signal from the AND gate 16. On the other hand, the transistor 53 is turned OFF in response to the LOW level gate signal from the OR gate 15.

At this time, the base electrode of the transistor 49 is connected to the power source $+E$ through the collector-emitter path of the transistor 52. Therefore, the transistor 49 is turned ON. Therefore, the solenoid 47a is energized to close the relay 47 for resuming the power supply to the motor 45. At the same time, by turning ON of the transistor 50, the base electrode of the transistor 48 is connected to the power source $+E$ through the collector-emitter path of the transistor 50 to be turned ON. Therefore, the relay switch 46 is shifted to the reverse position. As a result, the throttle valve open angle is decreases despite of increasing of the accelerator depression mangitude. This causes decreasing of the engine speed to decrease the driving torque to be distributed to the wheels for resuming road/tire traction.

Returning to FIG. 11, at the time $t_1$, the wheel acceleration $\alpha_w$ increased across the acceleration threshold $+a$. As a result, the gate signal of the OR gate 15 turns HIGH level. In response to HIGH level gate signal from the OR gate 15, the associated transistor 53 turns ON to connect the base electrode of the transistor 49 to the ground. As a result, the transistor 49a is held OFF. Thus, the solenoid 47a is maintained deenergized to place the relay 47 in the open position to block power supply. Therefore, the motor 45 is helded at the position at the time $t_{11}$.

In the shown example, the wheel acceleration $\alpha_w$ decreases across the acceleration threshold $+a$ while the thorttle valve 42 is held at the position of the time $t_{11}$ at the time $t_{12}$. In response to this, the gate signal level of the OR gates 15 turns LOW. Therefore, the transistor 53 is turned OFF to turn ON the transistor 49 by the HIGH level input from the NAND gate 54. Therefore, the solenoid 47a is exergized to resume power supply through the relay 47. At this time, since the gate signal level of the AND gate 16 is held LOW and thus the solenoide 46a is held deenergized to place the switching relay 46 at the forward position, the motor 45 is driven in forward direction to increase the throttle valve open angle to increase the driving torque at the wheels 1R, 1L, 2R and 2L. At a time $t_{13}$, the wheel acceleration $\alpha_w$ again increases across the acceleration threshold $+a$. As a result, the gate signal level of the OR gate 15 again turns HIGH. Therefore, the power supply to the motor 45 is stopped to maintain the throttle valve at the position at the time $t_{13}$.

At the time $t_{14}$, the wheel speed $V_w$ becomes greater than the vehicle speed reference value $(V_{iw} + \Delta V_w)$, this is detected by the comparator 20. In response to the HIGH level comparator signals from the comparators 20, the gate signal level of the AND gate 16 are turned HIGH. Therefore, the transistors 50 and 52 are turned ON. At the same time, the gate signal of the OR gate 15 turns LOW level. Therefore, the solenoids 46a and 47a are both energized to drive the motor 45 in reverse direction to reduce the throttle valve open angle.

At the time $t_{15}$, the wheel speed $V_w$ becomes lower than the vehicle speed reference value $(V_{iw} + \Delta V_w)$ to turn the comparator signal level of the comparator 20 LOW. This causes LOW level gate signal of the AND gate 16. As a result, the transistors 50 and 52 turn OFF to deenergize the solenoid 46a of the switching relay 46. Therefore, the switching relay 46 returns to the forward position.

At the time $t_{16}$, the wheel acceleration $\alpha_w$ is recovered across the deceleration threshold $-b$. The comparators 18 is responsive to increasing the wheel acceleration $\alpha_w$ across the deceleration threshold $-b$ to turn the comparator signal level to LOW. As a result, the gate signal level of the OR gate 15 turns LOW. Therefore, the transistor 53 are turned OFF to turn the transistor 49 ON to close the relay 47 to resume power supply to the motor 45. Therefore, the motor 45 is driven in forward direction to increase the driving torque.

Similarly, since the wheel acceleration $\alpha_w$ increases across the acceleration threshold at the time $t_{17}$, the motor 45 is stopped by stopping the power supply to hold the driving torque of the engine constant. In response to drop of the wheel acceleration across the deceleration threshold $-b$ at the time $t_{18}$, the power supply to the motor 45 is resumed to again increase the driving torque. At the time $t_{19}$, the wheel acceleration $\alpha_w$ again increases across the acceleration threshold $+a$. Therefore, the power supply to the motor 45 is blocked to stop driving to hold the throttle valve open angle constant. At the time $t_{20}$, the wheel speed $V_w$ increases across the vehicle speed reference value $V_{iw} + \Delta V_w$. Therefore, the motor 45 is driven in reverse direction to reduce the throttle valve open angle to reduce the driving torque of the engine. The throttle valve open angle is contineously reduced until the time $t_{21}$, at which the wheel acceleration $\alpha_w$ drops below the deceleration threshold $-b$.

As will be appreciated herefrom, the driving torque is adjusted so as to avoid wheel-spin due to excessive torque exerting on the wheels. In addition, according to the present invention, wheel slippaage is detected by one of a wheel speed indicative signal which is selected in relation to the vehicle speed to provide sufficient driving torque in low vehicle speed range for providing vehicle starting-up characteristics and to provide precise slip control in the high vehicle speed range for providing better drivability.

Though the present invention has been disclosed hereabove in terms of the preferred embodiment of the invention, in which the throttle valve angular position is controlled in order to control traction, it would be possible to adjust driving torque at the wheels in other ways. For example, it would be possible to adjust the driving torque distribution for respective wheels by adjusting slip in the power train. Therefore, the invention should be understood to include all of the possible embodiments or modification of the shown embodiment.

I claim:

1. A traction control system for an automotive vehicle comprising:

first sensor means for monitoring wheel speed of a first vehicular wheel for producing a first wheel speed indicative signal;

second sensor means for monitoring wheel speed of a second vehicular wheel for producing a second wheel speed indicative signal;

means for deriving a vehicle speed representative value based on one of said first and second wheel speed indicative signals, said deriving means comparing said vehicle speed representative value with a vehicle speed threshold in order to select one of said first and second wheel speed indicative signals having a value greater than the other indicative signals when said vehicle speed representative value is greater than said vehicle speed threshold and to select one of said first and second wheel speed indicative signals having a value smaller than the other when said vehicle speed representative value is smaller than said vehicle speed threshold; and means for comparing said selected one of said first and second wheel speed indicative signals with said vehicle speed representative value for producing a control signal to reduce driving torque to be distributed to said first and second vehicular wheels when said selected one of said first and second wheel speed indicative signals becomes greater than said vehicle speed representative value.

2. A traction control system as set forth in claim 1, which further comprises means for deriving wheel acceleration based on said selected one of said first and second wheel speed indicative signals and comparing said wheel acceleration with a given first acceleration threshold to produce a first command for latching one of said first and second wheel speed indicative signal value, and said vehicle speed representative value deriving means is responsive to said first command for latching one of said first and second wheel speed indicative value to derive said vehicle speed representative value based on the latched value.

3. A traction control system as set forth in claim 2, wherein said vehicle speed representative value deriving means selects one of said first and second wheel speed indicative signal having smaller value than the other.

4. A traction control system as set forth in claim 3, wherein said vehicle speed representative value deriving means measures an elapsed time from latching one of said first and second wheel speed indicative signal value to derive a value as a function of said elapsed time to be added for the latched value for deriving said vehicle speed indicative value.

5. A traction control system as set forth in claim 1, which further comprises a throttle valve operating mechanism for causing angular displacement of a throttle valve, said throttle valve operating mechanism is controlled by said control signal for reducing a throttle valve open angle when said selected one of first and second wheel speed indicative signal becomes greater than said vehicle speed representative value.

6. A traction control system as set forth in claim 5, wherein said throttle valve operating mechanism includes an electrically operated throttle servo system for driving said throttle valve to cause angular displacement thereof, said throttle servo system is normally responsive to a desired engine speed demand from an accelerator position sensor and responsive to said control signal for driving said throttle valve to reduce the open angle thereof.

7. A traction control system for an automotive vehicle comprising:

first sensor means for monitoring wheel speed of a faster vehicular wheel for producing a first wheel speed indicative signal;

second sensor means for monitoring wheel speed of a slower vehicular wheel for producing a second wheel speed indicative signal;

means for deriving a vehicle speed representative value based on a selected one of said first and second wheel speed indicative signals;

means for selecting one of said first and second wheel speed indicative signals, said selecting means comparing said vehicle speed representative value to a predetermined vehicle speed threshold to select said one of said first and second wheel speed indicative signals having a value greater than the other when said vehicle speed representative value is greater than said predetermined vehicle speed threshold, and for selecting one of said first or second wheel speed indicative signals having a value smaller than the other when said vehicle speed representative value is smaller than said predetermined vehicle speed threshold; and means for comparing said selected one of said first and second wheel speed indicative signals with said vehicle speed representative value for producing a control signal to reduce driving torque to said vehicular wheels when said selected one of said first and second wheel speed indicative signals becomes greater than said vehicle speed representative value.

8. A traction control system as set forth in claim 7, which further comprises means for deriving wheel acceleration based on said selected one of said first and second wheel speed indicative signals and comparing said wheel acceleration with a given first acceleration threshold to produce a first command for latching one of said first and second wheel speed indicative signal value, and said vehicle speed representative value deriving means is responsive to said first command for latching one of said first and second wheel speed indicative value to derive said vehicle speed representative value based on the latched value.

9. A traction control system as set forth in claim 8, wherein said vehicle speed representative value deriving means measures an elapsed time from latching one of said first and second wheel speed indicative signal value to derive a value as a function of said elapsed time to be added for the latched value for deriving said vehicle speed indicative value.

10. A traction control system as set forth in claim 7, which further comprises a throttle valve operating mechanism for causing angular displacement of a throttle valve, said throttle valve operating mechanism is controlled by said control signal for reducing a throttle valve open angle when said selected one of first and second wheel speed indicative signal becomes greater than said vehicle speed representative value.

11. A traction control system as set forth in claim 10, wherein said throttle valve operating mechanism includes an electrically operated throttle servo system for driving said throttle valve to cause angular displacement thereof, said throttle servo system is normally responsive to a desired engine speed demand from an accelerator position sensor and responsive to said control signal for driving said throttle valve to reduce the open angle thereof.

12. A method for controlling road/tire traction for an automotive vehicle comprising the steps of:
   monitoring wheel speed of a first vehicular wheel for producing a first wheel speed indicative signal;
   monitoring wheel speed of a second vehicular wheel for producing a second wheel speed indicative signal;
   deriving a vehicle speed representative value based on one of said first and second wheel speed indicative signals, and comparing said vehicle speed representative value to a vehicle speed threshold to select one of said first and second wheel speed indicative signals having a value greater than the other when said vehicle speed representative value is greater than said vehicle speed threshold and to select one of said first and second wheel speed indicative signals having a value smaller than the other when said vehicle speed representative value is smaller than said vehicle speed threshold; and
   comparing said selected one of said first and second wheel speed indicative signals with said vehicle speed representative value for producing a control signal to reduce driving torque to be distributed to said first and second vehicular wheels when said selected one of said first and second wheel speed indicative signals becomes greater than said vehicle speed representative value.

13. A method as set forth in claim 12, which further comprises a step of deriving wheel acceleration based on said selected one of said first and second wheel speed indicative signals and comparing said wheel acceleration with a given first acceleration threshold to produce a first command for latching one of said first and second wheel speed indicative signal values, and said vehicle speed representative value deriving step includes responding to said first command for latching said one of said first and second wheel speed indicative values to derive said vehicle speed representative value based on the latched value.

14. A method as set forth in claim 13, wherein, in said vehicle speed representative value deriving step, one of said first and second wheel speed indicative signals having a value smaller than the other is selected.

15. A method as set forth in claim 14, wherein, in said vehicle speed representative value deriving step, an elapsed time is measured from said latching of one of said first and second wheel speed indicative signal values to derive a value as a function of said elapsed time to be added to the latched value for deriving said vehicle speed indicative value.

16. A traction control system for an automotive vehicle comprising:
   first sensor means for monitoring wheel speed of a first vehicular wheel for producing a first wheel speed indicative signal;
   second sensor means for monitoring wheel speed of a second vehicular wheel for producing a second wheel speed indicative signal;
   means for deriving a vehicle speed representative value based on one of said first and second wheel speed indicative signals, said vehicle speed deriving means selecting one of said first and second wheel speed indicative signals having a value smaller than the other for deriving said vehicle speed representative value;
   means for comparing said selected one of said first and second wheel speed indicative signals with said vehicle speed representative value for producing a control signal to reduce driving torque to be distributed to said first and second vehicular wheels when said selected one of first and second wheel speed indicative signals becomes greater than said vehicle speed representative value.

17. A traction control system for an automotive vehicle comprising:
   first sensor means for monitoring wheel speed of a first vehicular wheel for producing a first wheel speed indicative signal;
   second sensor means for monitoring wheel speed of a second vehicular wheel for producing a second wheel speed indicative signal;
   means for deriving a vehicle speed representative value based on one of said first and second wheel speed indicative signals, said vehicle speed deriving means selecting one of said first and second wheel speed indicative signals having a value smaller than the other while said vehicle speed representative value is smaller than a given vehicular speed criterion and selecting one of said first and second wheel speed indicative signals having a value greater than the other while said vehicle speed representative value is greater than or equal to said vehicle speed criterion; and
   means for comparing said selected one of said first and second wheel speed indicative signals with said vehicle speed representative value for producing a control signal to reduce driving torque to be distributed to said first and second vehicular wheels when said selected one of said first and second wheel speed indicative signals becomes greater than said vehicle speed representative value.

* * * * *